United States Patent
Wentink et al.

(10) Patent No.: US 9,961,170 B2
(45) Date of Patent: May 1, 2018

(54) ETHERTYPE PACKET DISCRIMINATION DATA TYPE

(71) Applicant: QUALCOMM Incorporated, San Diego, CA (US)

(72) Inventors: Maarten Menzo Wentink, Naarden (NL); Alfred Asterjadhi, San Diego, CA (US); Simone Merlin, San Diego, CA (US); Jouni Malinen, Tuusula (FI)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 14/950,102

(22) Filed: Nov. 24, 2015

(65) Prior Publication Data

US 2016/0150058 A1     May 26, 2016

Related U.S. Application Data

(60) Provisional application No. 62/084,324, filed on Nov. 25, 2014, provisional application No. 62/102,933, filed on Jan. 13, 2015.

(51) Int. Cl.
| | |
|---|---|
| *H04L 12/46* | (2006.01) |
| *H04L 29/06* | (2006.01) |
| *H04W 84/12* | (2009.01) |
| *H04L 29/08* | (2006.01) |

(52) U.S. Cl.
CPC .......... *H04L 69/22* (2013.01); *H04L 12/4633* (2013.01); *H04L 69/321* (2013.01); *H04W 84/12* (2013.01)

(58) Field of Classification Search
CPC ........... H04L 12/4633; H04L 29/06068; H04L 29/06156; H04L 29/0653; H04L 69/08; H04L 69/22; H04L 69/32; H04L 69/321; H04L 2212/00; H04W 80/02; H04W 80/04; H04W 80/06; H04W 80/12; H04W 84/12
See application file for complete search history.

(56) References Cited

U.S. PATENT DOCUMENTS

| | | | |
|---|---|---|---|
| 7,506,065 B2 * | 3/2009 | LaVigne | H04L 67/1095 709/224 |
| 7,760,719 B2 * | 7/2010 | Yik | H04L 49/3063 370/389 |

(Continued)

OTHER PUBLICATIONS

International Search Report and Written Opinion—PCT/US2015/062719—ISA/EPO—dated Mar. 24, 2016.

*Primary Examiner* — Alpus H Hsu
(74) *Attorney, Agent, or Firm* — Paradice and Li LLP/Qualcomm

(57) ABSTRACT

Apparatuses and methods are disclosed that may allow a wireless device to process an Ethertype data packet encapsulated in a frame based on whether the frame contains an Ethertype Packet Discrimination (EPD) indicator. The wireless device may receive the frame from another wireless device over a wireless network, and may detect a presence of the EPD indicator in the received frame. Then, the wireless device may identify a protocol type of the Ethertype data packet according to an EPD operation based on the presence of the EPD indicator, or may identify the protocol type of the Ethertype data packet according to an LPD operation based on an absence of the EPD indicator.

20 Claims, 11 Drawing Sheets

(56) References Cited

U.S. PATENT DOCUMENTS

| | | | |
|---|---|---|---|
| 7,953,457 B2 * | 5/2011 | Salomone | H04W 52/0225 370/311 |
| 8,280,457 B2 * | 10/2012 | Salomone | H04W 52/0225 370/311 |
| 8,427,990 B2 * | 4/2013 | Itagaki | H04W 76/023 370/254 |
| 8,543,174 B2 * | 9/2013 | Salomone | H04W 52/0225 370/311 |
| 8,762,543 B2 * | 6/2014 | Yao | H04W 76/023 709/223 |
| 8,908,862 B2 * | 12/2014 | Chu | H04K 1/003 380/44 |
| 8,923,285 B2 * | 12/2014 | Wentink | H04L 69/22 370/389 |
| 8,948,179 B2 * | 2/2015 | Zhao | H04L 45/42 370/392 |
| 8,964,554 B2 * | 2/2015 | Petry | H04L 63/0272 370/235 |
| 9,015,467 B2 * | 4/2015 | Buer | H04L 29/06 713/150 |
| 9,232,026 B2 * | 1/2016 | Olsen | H04L 69/08 |
| 9,271,136 B2 * | 2/2016 | Wentink | H04W 8/005 |
| 2003/0115356 A1 | 6/2003 | Block et al. | |
| 2004/0218579 A1 | 11/2004 | An | |
| 2008/0137567 A1 | 6/2008 | Fang | |
| 2010/0067385 A1 * | 3/2010 | Liu | H04L 12/4633 370/241.1 |
| 2012/0275447 A1 * | 11/2012 | Fang | H04W 28/06 370/338 |
| 2014/0029451 A1 * | 1/2014 | Nguyen | H04L 43/50 370/252 |
| 2014/0204876 A1 * | 7/2014 | Fang | H04W 28/06 370/329 |
| 2015/0264726 A1 * | 9/2015 | Zhu | H04W 76/021 370/329 |
| 2016/0057055 A1 * | 2/2016 | Barrett | H04L 45/74 370/329 |

\* cited by examiner

700

| Type value B3 B2 | Type description | Subtype value B7 B6 B5 B4 | Subtype description |
|---|---|---|---|
| 10 | Data | 0000 | Data |
| 10 | Data | 0001 | Data + CF-Ack |
| 10 | Data | 0010 | Data + CF-Poll |
| 10 | Data | 0011 | Data + CF-Ack + CF-Poll |
| 10 | Data | 0100 | Null (no data) |
| 10 | Data | 0101 | CF-Ack (no data) |
| 10 | Data | 0110 | CF-Poll (no data) |
| 10 | Data | 0111 | CF-Ack + CF-Poll (no data) |
| 10 | Data | 1000 | QoS Data |
| 10 | Data | 1001 | QoS Data + CF-Ack |
| 10 | Data | 1010 | QoS Data + CF-Poll |
| 10 | Data | 1011 | QoS Data + CF-Ack + CF-Poll |
| 10 | Data | 1100 | QoS Null (no data) |
| 10 | Data | 1101 | Reserved |
| 10 | Data | 1110 | QoS CF-Poll (no data) |
| 10 | Data | 1111 | QoS CF-Ack + CF-Poll (no data) |
| 11 | Extension | 0000 | DMG Beacon |
| 11 | Extension | 0001-1111 | Reserved |

FIG. 7

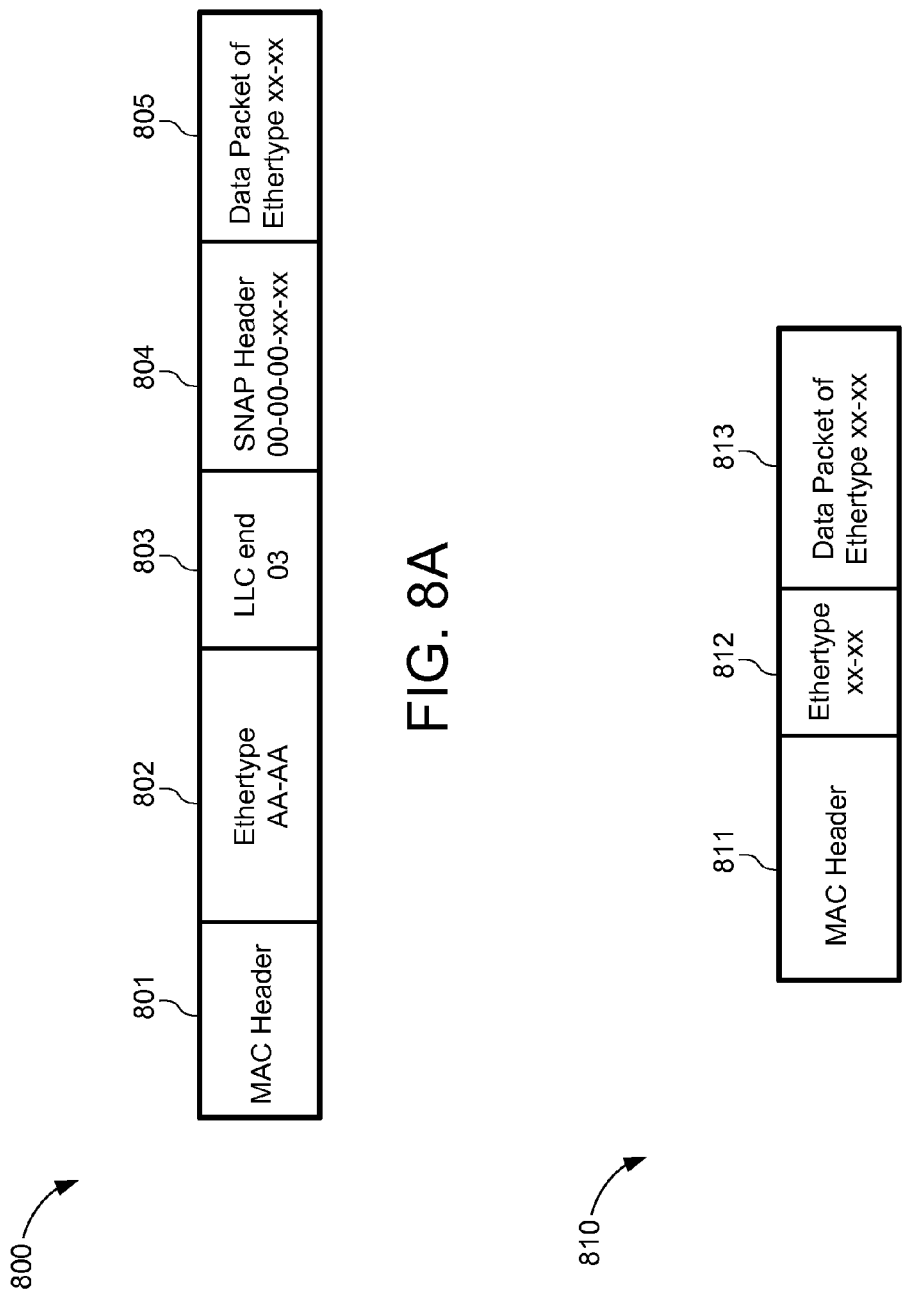

ETHERTYPE PACKET DISCRIMINATION DATA TYPE

CROSS-REFERENCE TO RELATED APPLICATIONS

This application claims priority to and commonly-owned U.S. Provisional Patent Application No. 62/084,324, titled "Ethertype Packet Discrimination Data Type," filed Nov. 25, 2014, and to and commonly-owned U.S. Provisional Patent Application No. 62/102,933, titled "Ethertype Packet Discrimination Data Type," filed Jan. 13, 2015, both of which are hereby incorporated by reference in their entireties.

TECHNICAL FIELD

The example embodiments relate generally to wireless networks, and specifically packet discrimination in Wi-Fi networks.

BACKGROUND OF RELATED ART

A Wi-Fi network may be formed by one or more access points (APs) that provide a wireless communication channel or link with a number of client devices or stations (STAs). Each AP, which may correspond to a Basic Service Set (BSS), periodically broadcasts beacon frames to enable any STAs within wireless range of the AP to establish and/or maintain a communication link with the Wi-Fi network. Once a STA is associated with the AP, the AP and the STA may exchange data frames. Data frames transmitted over a Wi-Fi network may carry higher-level protocol data such as, for example, Internet Protocol (IP) data packets.

A data frame that encapsulates higher-level protocol data may include a Media Access Control (MAC) header, a Logical Link Control (LLC) header, a Subnetwork Access Protocol (SNAP) header, and a frame body. The frame body may contain an encapsulated data packet of a given Ethertype. The LLC header and the SNAP header, which may be collectively referred to as the LLC/SNAP header, may indicate the Ethertype of the encapsulated data packet. This layering technique, which is commonly referred to as LLC Packet Discrimination (LPD), is the default format of MAC service data units (MSDUs), a number of which may be contained in a MAC protocol data unit (MPDU). When an MPDU is transferred from the MAC layer to the physical (PHY) layer of a device, a number of MPDUs may be encapsulated within a physical layer protocol data unit (PPDU), which may then be transmitted to another device over the Wi-Fi network.

When such data frames are transmitted over Wi-Fi networks, some of the bytes in the LLC/SNAP header may remain constant. For example, when a data frame encapsulates a data packet identified by an Ethertype, six (6) bytes of the data frame's LLC/SNAP header may not change, irrespective of the Ethertype. In such situations, transmission of these 6 bytes of the LLC/SNAP header may be unnecessary.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Apparatuses and methods are disclosed that may allow a wireless device to process an Ethertype data packet encapsulated in a frame based on whether the frame contains an Ethertype Packet Discrimination (EPD) indicator. In one example, a method for processing an Ethertype data packet encapsulated in a frame is disclosed. The method may include receiving the frame from a second wireless device over a wireless network; detecting a presence of an Ethertype Packet Discrimination (EPD) indicator in the received frame; and based on the presence of the EPD indicator in the received frame, identifying a protocol type of the Ethertype data packet according to an EPD operation.

In another example, a first wireless device for processing an Ethertype data packet encapsulated in a frame is disclosed. The first wireless device may include one or more processors and a memory configured to store instructions. Execution of the instructions by the one or more processors may cause the first wireless device to receive the frame from a second wireless device over a wireless network; detect a presence of an Ethertype Packet Discrimination (EPD) indicator in the received frame; and based on the presence of the EPD indicator in the received frame, identify a protocol type of the Ethertype data packet according to an EPD operation.

In another example, a non-transitory computer-readable storage medium is disclosed. The non-transitory computer-readable storage medium may store instructions that, when executed by one or more processors of a first wireless device, may cause the first wireless device to process an Ethertype data packet encapsulated in a frame by performing operations including receiving the frame from a second wireless device over a wireless network; detecting a presence of an Ethertype Packet Discrimination (EPD) indicator in the received frame; and based on the presence of the EPD indicator in the received frame, identifying a protocol type of the Ethertype data packet according to an EPD operation.

In another example, a first wireless device for processing an Ethertype data packet encapsulated in a frame is disclosed. The first wireless device may include means for receiving the frame from a second wireless device over a wireless network; means for detecting a presence of an Ethertype Packet Discrimination (EPD) indicator in the received frame; and means for identifying a protocol type of the Ethertype data packet according to an EPD operation based on the presence of the EPD indicator in the received frame.

BRIEF DESCRIPTION OF THE DRAWINGS

The example embodiments are illustrated by way of example and are not intended to be limited by the figures of the accompanying drawings, where like reference numerals refer to corresponding parts throughout the drawing figures.

FIG. 7 shows a table depicting frame type and sub-type values that may be included in the MAC headers of FIGS. 6A and 6B.

FIG. 8A shows an example data frame that contains an encapsulated data packet of Ethertype xx-xx formatted using LPD, in accordance with example embodiments.

FIG. 8B shows an example data frame that contains an encapsulated data packet of Ethertype xx-xx formatted using EPD, in accordance with example embodiments.

DETAILED DESCRIPTION

Figure 1:
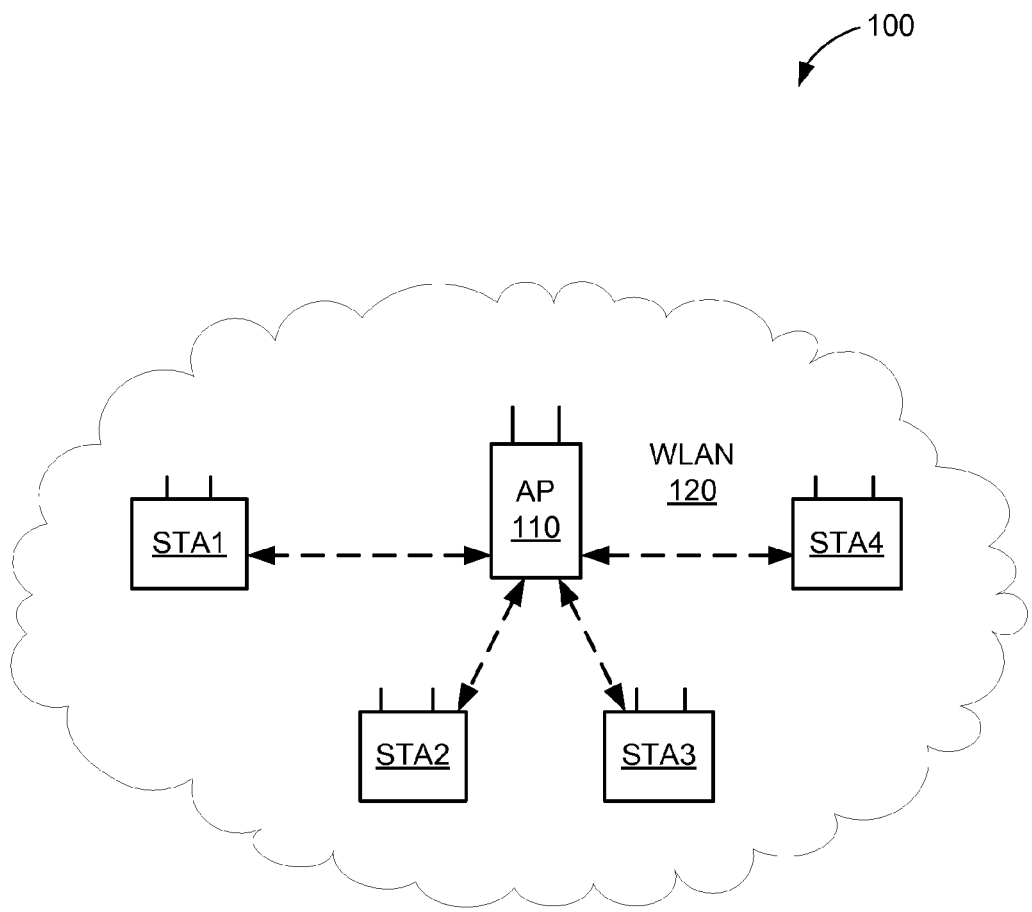
FIG. 1 shows a block diagram of a wireless system within which the example embodiments may be implemented.

The example embodiments are described below in the context of data exchanges between Wi-Fi enabled devices for simplicity only. It is to be understood that the example embodiments are equally applicable to data exchanges using signals of other various wireless standards or protocols. As used herein, the terms "WLAN" and "Wi-Fi" can include communications governed by the IEEE 802.11 family of standards, Bluetooth, HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, although described below in terms of an infrastructure WLAN system including one or more APs and a number of STAs, the example embodiments are equally applicable to other WLAN systems including, for example, multiple WLANs, peer-to-peer (or Independent Basic Service Set) systems, Wi-Fi Direct systems, and/or Hotspots. In addition, although described herein in terms of exchanging data frames between wireless devices, the example embodiments may be applied to the exchange of any data unit, packet, and/or frame between wireless devices. Thus, the term "frame" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scopes all embodiments defined by the appended claims.

Current Wi-Fi standards (e.g., as defined in the IEEE 802.11 family of standards) allow wireless devices to exchange data frames that encapsulate data packets of higher-level protocols (e.g., network-layer protocols such as IP packets and Ethernet packets) over a shared wireless medium associated with a Wi-Fi network. An access point (AP) may serve as a bridge between the shared wireless medium and a wired medium (e.g., corresponding to a backhaul connection or network). When a data frame bound for the wired medium is received on a wireless interface of an AP, the AP "bridges" the frame from the wireless medium to the wired medium.

As mentioned above, data frames containing encapsulated data packets typically include a Media Access Control (MAC) header, a Logical Link Control (LLC) header, a Subnetwork Access Protocol (SNAP) header, and a frame body that includes the encapsulated data packets. The Ethernet type code (e.g., the "Ethertype") of the encapsulated data packets may be indicated by the SNAP header. For example, when a data frame encapsulates a data packet of Ethertype xx-xx (where each "x" may represent a hexadecimal number), the data frame's LLC header may contain the value "AA-AA-03" to indicate the presence of a SNAP header, and the SNAP header may contain the value "00-00-00-xx-xx" to indicate that the data packet is of Ethertype xx-xx. When a data frame encapsulating a data packet identified by an Ethertype is transmitted over a wireless medium, 6 bytes of the data frame's LLC/SNAP header do not change, regardless of the Ethertype.

Recent revisions to the IEEE 802.11 standards allow data frames containing encapsulated Ethertype data packets to omit the six "non-changing" bytes of the data frame's LLC/SNAP header. Instead, these data frames may include an Ethertype header following the MAC header. This layering technique may be referred to as Ethertype Packet Discrimination (EPD). If a pair of wireless devices supports EPD, then data frames exchanged between the pair of wireless devices may not include the six non-changing bytes of the LLC/SNAP headers, thereby reducing the overhead of exchanging data frames between the pair of wireless devices. Conversely, if one (or both) of the pair of wireless devices does not support EPD, then the pair of wireless devices may use LPD when exchanging data frames.

When a wireless network includes some wireless devices that support EPD and includes other wireless devices that do not support EPD, it may be difficult to determine which of the communication links between the various wireless devices may support EPD. Thus, in accordance with the example embodiments, data frames transmitted in the wireless network may include information indicating whether the data frames include Ethertype data packets formatted using EPD, for example, so that the various wireless devices within the wireless network may readily discern whether received data frames contain encapsulated Ethertype data packets formatted using EPD or LPD. For some implementations, when a wireless device transmits a data frame encapsulating an Ethertype data packet, the wireless device may replace at least a portion of the LLC/SNAP header with an Ethertype field. The Ethertype field may contain fewer bytes than the replaced portion of the LLC/SNAP header, thereby reducing transmission overhead of the data frame. The Ethertype field, which may follow the MAC header of the data frame, may indicate whether EPD or LPD is used to format the encapsulated Ethertype data packets. For example, the Ethertype field of the data frame may be set to a selected value to indicate the use of LPD to format the encapsulated Ethertype data packets. In some aspects, the selected Ethertype value may also indicate that the replaced portion of LLC/SNAP header follows the Ethertype field in the data frame. Conversely, a data frame for which the Ethertype field stores a value other than the selected value may indicate the use of EPD to format the encapsulated Ethertype data packets.

For other implementations, an EPD indicator may be included in the MAC header of a data frame. The presence of the EPD indicator in the MAC header may indicate the use of EPD, while the absence of the EPD indicator in the MAC header may indicate the use of LPD. In this manner, a wireless device may indicate the use of EPD on a packet-by-packet basis by including an EPD indicator in each of the transmitted data frames.

Indicating the use of EPD on a packet-by-packet basis may be important for a receiving device to identify the protocol type (e.g., the Ethertype) of the encapsulated data packet, for example, so that the receiving device may parse the packet in accordance with classification rules and/or policies that define the protocol. Thus, providing an indication as to whether data packets encapsulated in a data frame are formatting using EPD (or LPD) may allow the receiving device to select an appropriate technique or operation to identify the protocol type of the encapsulated data packet. For example, if the encapsulated data packet is formatted using EPD, then the receiving device may use a suitable EPD technique or operation to identify the protocol type of the data packet; conversely, if the encapsulated data packet is formatted using LPD, then the receiving device may use a suitable LPD technique or operation to identify the protocol type of the data packet.

FIG. 1 is a block diagram of a wireless system 100 within which the example embodiments may be implemented. The wireless system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 is assigned a unique MAC address that is programmed therein by, for example, the manufacturer of the access point. Similarly, each of STA1-STA4 is also assigned a unique MAC address. For some embodiments, the wireless system 100 may correspond to a multiple-input multiple-output (MIMO) wireless network. Further, although the WLAN 120 is depicted in FIG. 1 as an infrastructure BSS, for other example embodiments, WLAN 120 may be an IBSS, an ad-hoc network, or a peer-to-peer (P2P) network (e.g., operating according to the Wi-Fi Direct protocols).

Each of stations STA1-STA4 may be any suitable Wi-Fi enabled wireless device including, for example, a cell phone, personal digital assistant (PDA), tablet device, laptop computer, or the like. Each station STA may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each station STA may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 9.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, AP 110 may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 9.

For the stations STA1-STA4 and/or AP 110, the one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band and/or within a 5 GHz frequency band in accordance with the IEEE 802.11 specification. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within the STA may be any technically feasible transceiver such as a ZigBee transceiver described by a specification from the ZigBee specification, a WiGig transceiver, and/or a HomePlug transceiver described a specification from the HomePlug Alliance.

AP 110, which may correspond to a Basic Service Set (BSS), may periodically broadcast beacon frames to enable any STAs within wireless range of the AP 110 to establish and/or maintain a communication link with the Wi-Fi network. The bacon frames, which may include a traffic indication map (TIM) indicating whether the AP 110 has queued downlink data for the stations STA1-STA4, are typically broadcast according to a target beacon transmission time (TBTT) schedule. The broadcasted beacon frames may also include the AP's timing synchronization function (TSF) value. The stations STA1-STA4 may synchronize their own local TSF values with the broadcasted TSF value, for example, so that all the stations STA1-STA4 are synchronized with each other and the AP 110.

Figure 2:
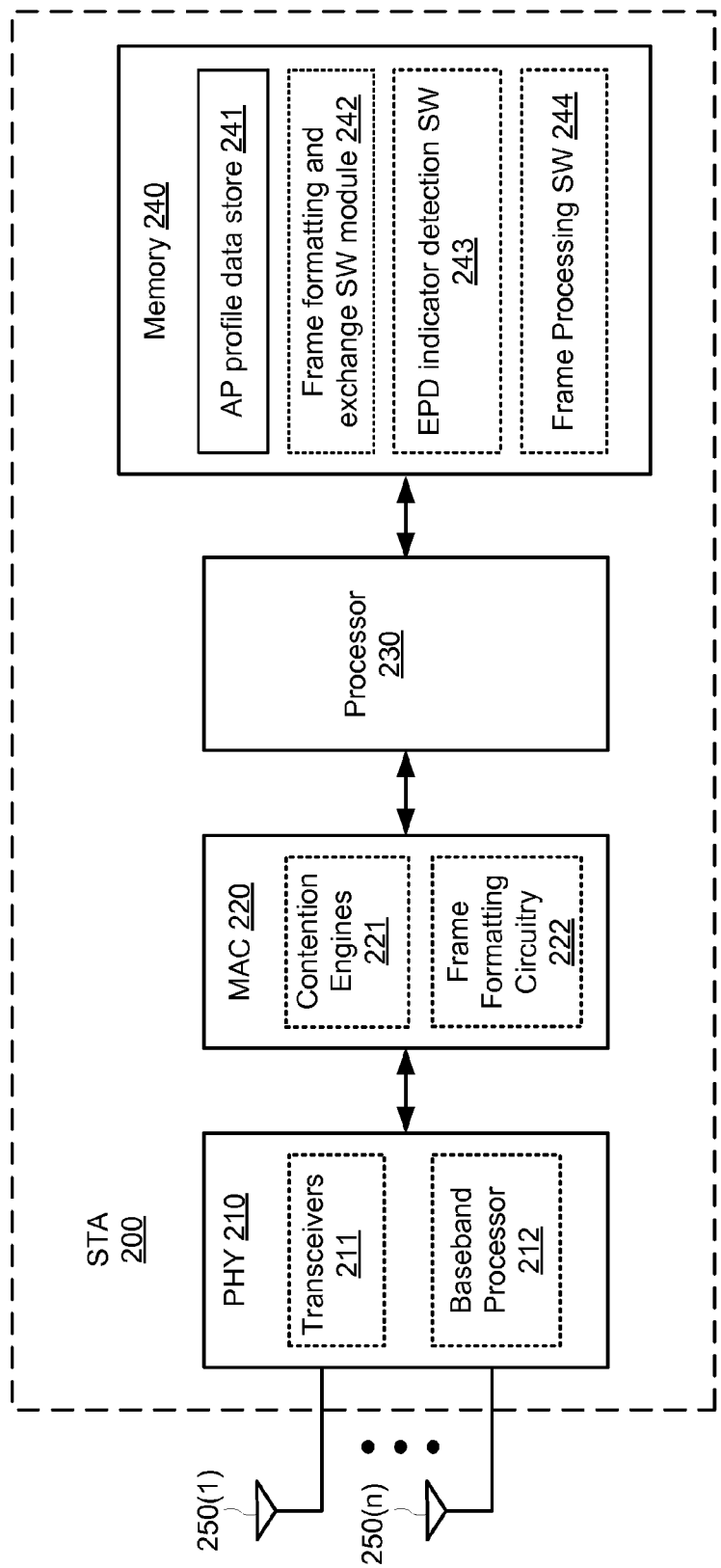
FIG. 2 shows a block diagram of a wireless station (STA) in accordance with example embodiments.

FIG. 2 shows an example STA 200 that may be one embodiment of one or more of the stations STA1-STA4 of FIG. 1. The STA 200 may include a PHY device 210 including at least a number of transceivers 211 and a baseband processor 212, may include a MAC 220 including at least a number of contention engines 221 and frame formatting circuitry 222, may include a processor 230, may include a memory 240, and may include a number of antennas 250(1)-250(n). The transceivers 211 may be coupled to antennas 250(1)-250(n), either directly or through an antenna selection circuit (not shown for simplicity). The transceivers 211 may be used to transmit signals to and receive signals from AP 110 and/or other STAs (see also FIG. 1), and may be used to scan the surrounding environment to detect and identify nearby access points and/or other STAs (e.g., within wireless range of STA 200). Although not shown in FIG. 2 for simplicity, the transceivers 211 may include any number of transmit chains to process and transmit signals to other wireless devices via antennas 250(1)-250(n), and may include any number of receive chains to process signals received from antennas 250(1)-250(n). Thus, for example embodiments, the STA 200 may be configured for MIMO operations. The MIMO operations may include single-user MIMO (SU-MIMO) operations and multi-user MIMO (MU-MIMO) operations.

The baseband processor 212 may be used to process signals received from processor 230 and/or memory 240 and to forward the processed signals to transceivers 211 for transmission via one or more of antennas 250(1)-250(n), and may be used to process signals received from one or more of antennas 250(1)-250(n) via transceivers 211 and to forward the processed signals to processor 230 and/or memory 240.

For purposes of discussion herein, MAC 220 is shown in FIG. 2 as being coupled between PHY device 210 and processor 230. For actual embodiments, PHY device 210, MAC 220, processor 230, and/or memory 240 may be connected together using one or more buses (not shown for simplicity).

The contention engines 221 may contend for access to one more shared wireless mediums, and may also store packets for transmission over one more shared wireless mediums. The STA 200 may include one or more contention engines 221 for each of a plurality of different access categories. For other embodiments, the contention engines 221 may be separate from MAC 220. For still other embodiments, the contention engines 221 may be implemented as one or more software modules (e.g., stored in memory 240 or stored in memory provided within MAC 220) containing instructions that, when executed by processor 230, perform the functions of contention engines 221.

The frame formatting circuitry 222 may be used to create and/or format frames received from processor 230 and/or memory 240 (e.g., by adding MAC headers to PDUs provided by processor 230), and may be used to re-format frames received from PHY device 210 (e.g., by stripping MAC headers from frames received from PHY device 210).

Memory 240 may include an AP profile data store 241 that stores profile information for a plurality of APs. The profile information for a particular AP may include information including, for example, the AP's service set identifier (SSID), MAC address, channel information, whether EPD is supported, RSSI values, goodput values, channel state information (CSI), supported data rates, connection history with the AP, a trustworthiness value of the AP (e.g., indicating a level of confidence about the AP's location, etc.), and any other suitable information pertaining to or describing the operation of the AP.

Figure 9:
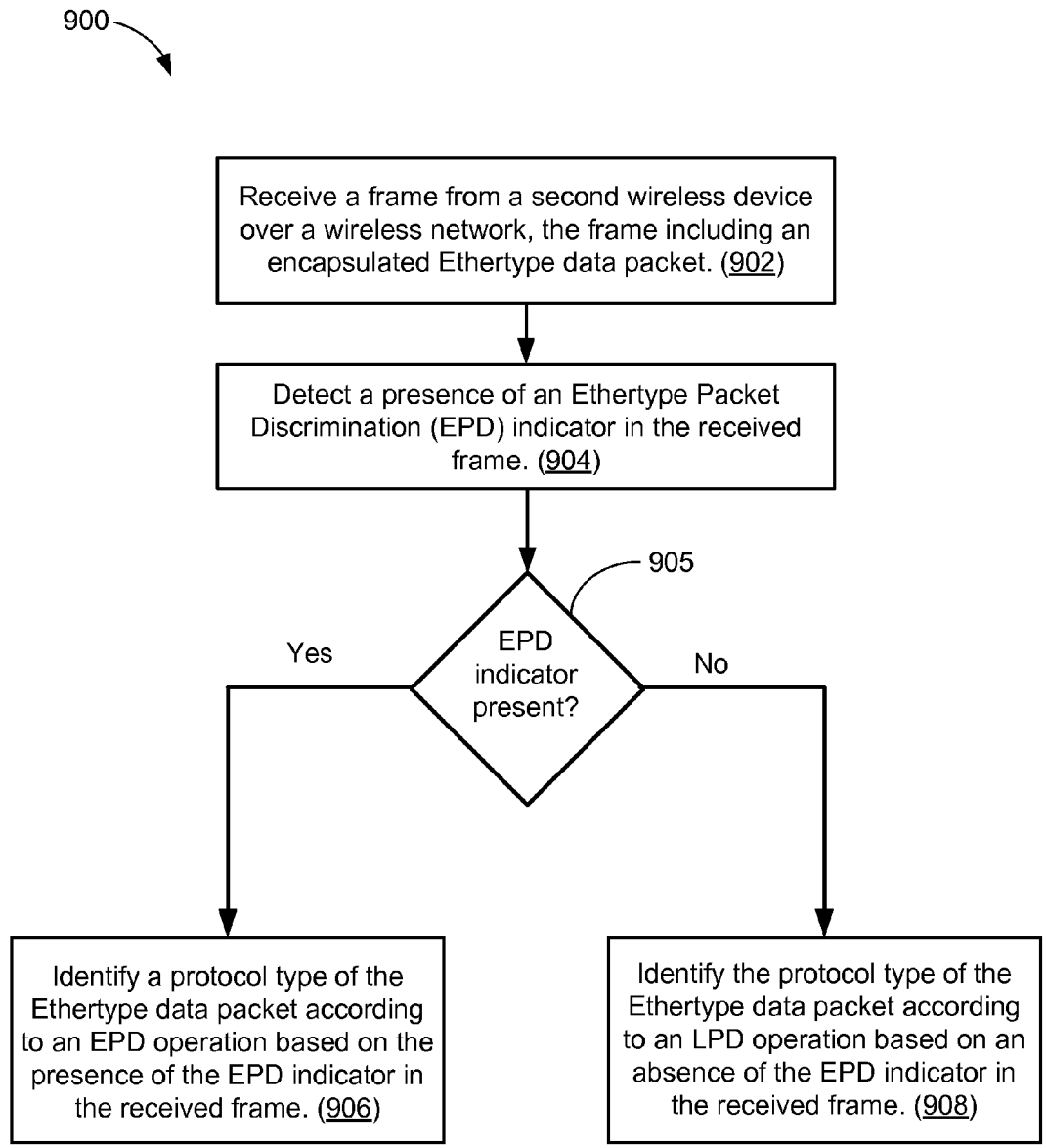
FIG. 9 shows an illustrative flow chart depicting an example operation for processing an Ethertype data packet encapsulated within a data frame in accordance with example embodiments.

Memory 240 may also include a non-transitory computer-readable medium (e.g., one or more nonvolatile memory elements, such as EPROM, EEPROM, Flash memory, a hard drive, and so on) that may store at least the following software (SW) modules:

- a frame formatting and exchange software module 242 to facilitate the creation and exchange of any suitable frames (e.g., data frames, control frame, and management frames) between STA 200 and other wireless devices (e.g., as described for one or more operations of FIG. 9);
- an EPD indicator detection software module 243 to facilitate the detection of an EPD indicator in an incoming frame (e.g., as described for one or more operations of FIG. 9); and
- a frame processing software module 244 to process one or more packets encapsulated in the incoming frame based, at least in part, on detection of the EPD indicator in the incoming frame (e.g., as described for one or more operations of FIG. 9).

Each software module includes instructions that, when executed by processor 230, cause STA 200 to perform the corresponding functions. The non-transitory computer-readable medium of memory 240 thus includes instructions for performing all or a portion of the operations depicted in FIG. 9.

Processor 230 may be any suitable one or more processors capable of executing scripts or instructions of one or more software programs stored in STA 200 (e.g., within memory 240). For example, processor 230 may execute the frame formatting and exchange software module 242 to facilitate the creation and exchange of any suitable frames (e.g., data frames, control frame, and management frames) between STA 200 and other wireless devices. Processor 230 may execute the EPD indicator detection software module 243 to facilitate the detection of an EPD indicator in an incoming frame. Processor 230 may execute the frame processing software module 244 to process one or more packets encapsulated in the incoming frame based, at least in part, on detection of the EPD indicator in the incoming frame.

For at least some embodiments, if execution of the EPD indicator detection software module 243 determines that a data packet encapsulated in the incoming frame is formatted using EPD, then execution of the frame processing software module 244 may cause the STA 200 to use a suitable EPD technique or operation to identify the protocol type of the encapsulated data packet. Conversely, if execution of the EPD indicator detection software module 243 determines that the data packet encapsulated in the incoming frame is not formatted using EPD (or determines that the encapsulated data packet is formatted using LPD), then execution of the frame processing software module 244 may cause the STA 200 to use a suitable LPD technique or operation to identify the protocol type of the encapsulated data packet.

Figure 3:
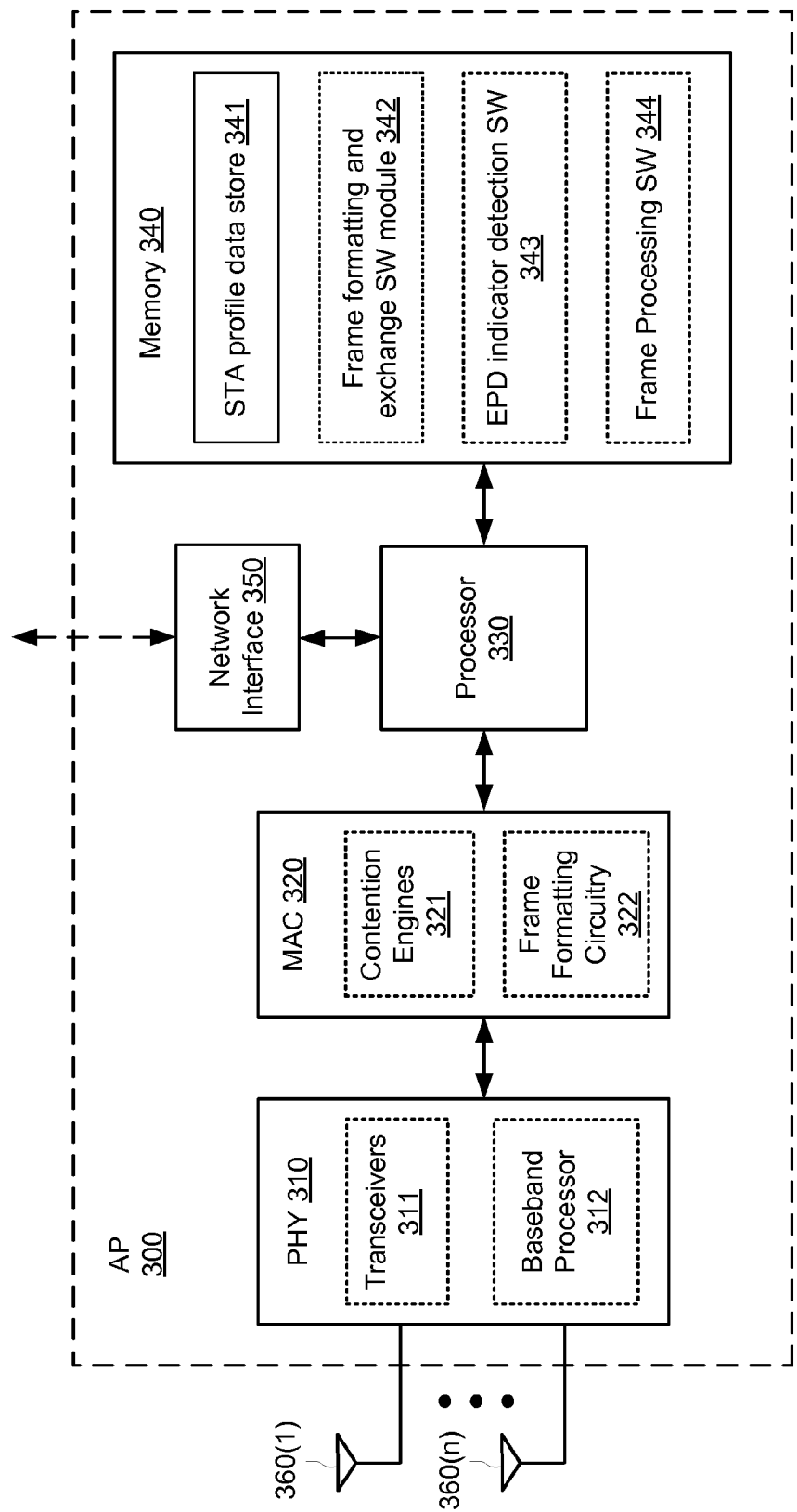
FIG. 3 shows a block diagram of an access point (AP) in accordance with example embodiments.

FIG. 3 shows an example AP 300 that may be one embodiment of the AP 110 of FIG. 1. AP 300 may include a PHY device 310 including at least a number of transceivers 311 and a baseband processor 312, may include a MAC 320 including at least a number of contention engines 321 and frame formatting circuitry 322, may include a processor 330, may include a memory 340, may include a network interface 350, and may include a number of antennas 360(1)-360(n). The transceivers 311 may be coupled to antennas 360(1)-360(n), either directly or through an antenna selection circuit (not shown for simplicity). The transceivers 311 may be used to communicate wirelessly with one or more STAs, with one or more other APs, and/or with other suitable devices. Although not shown in FIG. 3 for simplicity, the transceivers 311 may include any number of transmit chains to process and transmit signals to other wireless devices via antennas 360(1)-360(n), and may include any number of receive chains to process signals received from antennas 360(1)-360(n). Thus, for example embodiments, the AP 300 may be configured for MIMO operations including, for example, SU-MIMO operations and MU-MIMO operations.

The baseband processor 312 may be used to process signals received from processor 330 and/or memory 340 and to forward the processed signals to transceivers 311 for transmission via one or more of antennas 360(1)-360(n), and may be used to process signals received from one or more of antennas 360(1)-360(n) via transceivers 311 and to forward the processed signals to processor 330 and/or memory 340.

The network interface 350 may be used to communicate with a WLAN server (not shown for simplicity) either directly or via one or more intervening networks and to transmit signals.

Processor 330, which is coupled to PHY device 310, to MAC 320, to memory 340, and to network interface 350, may be any suitable one or more processors capable of executing scripts or instructions of one or more software programs stored in AP 300 (e.g., within memory 340). For purposes of discussion herein, MAC 320 is shown in FIG. 3 as being coupled between PHY device 310 and processor 330. For actual embodiments, PHY device 310, MAC 320, processor 330, memory 340, and/or network interface 350 may be connected together using one or more buses (not shown for simplicity).

The contention engines 321 may contend for access to the shared wireless medium, and may also store packets for transmission over the shared wireless medium. For some embodiments, AP 300 may include one or more contention engines 321 for each of a plurality of different access categories. For other embodiments, the contention engines 321 may be separate from MAC 320. For still other embodiments, the contention engines 321 may be implemented as one or more software modules (e.g., stored in memory 340 or within memory provided within MAC 320) containing instructions that, when executed by processor 330, perform the functions of contention engines 321.

The frame formatting circuitry 322 may be used to create and/or format frames received from processor 330 and/or memory 340 (e.g., by adding MAC headers to PDUs provided by processor 330), and may be used to re-format frames received from PHY device 310 (e.g., by stripping MAC headers from frames received from PHY device 310).

Memory 340 may include a STA profile data store 341 that stores profile information for a plurality of STAs. The profile information for a particular STA may include information including, for example, its MAC address, whether EPD is supported, supported data rates, connection history with AP 300, and any other suitable information pertaining to or describing the operation of the STA.

Memory 340 may also include a non-transitory computer-readable medium (e.g., one or more nonvolatile memory elements, such as EPROM, EEPROM, Flash memory, a hard drive, and so on) that may store at least the following software (SW) modules:

- a frame formatting and exchange software module 342 to facilitate the creation and exchange of any suitable frames (e.g., data frames, control frames, and management frames) between AP 300 and other wireless devices (e.g., as described for one or more operations of FIG. 9);
- an EPD indicator detection software module 343 to facilitate the detection of an EPD indicator in an incoming frame (e.g., as described for one or more operations of FIG. 9); and
- a frame processing software module 344 to process one or more packets encapsulated in the incoming frame based, at least in part, on detection of the EPD indicator in the incoming frame (e.g., as described for one or more operations of FIG. 9).

Each software module includes instructions that, when executed by processor 330, cause AP 300 to perform the corresponding functions. The non-transitory computer-readable medium of memory 340 thus includes instructions for performing all or a portion of the AP-side operations depicted in FIG. 9.

Processor 330 may execute the frame formatting and exchange software module 342 to facilitate the creation and exchange of any suitable frames (e.g., data frames, control frames, and management frames) between AP 300 and other wireless devices. Processor 330 may execute the EPD indicator detection software module 343 to facilitate the detection of an EPD indicator in an incoming frame. Processor 330 may execute the frame processing software module 344 to process one or more packets encapsulated in the incoming frame based, at least in part, on detection of the EPD indicator in the incoming frame.

For at least some embodiments, if execution of the EPD indicator detection software module 343 determines that a data packet encapsulated in the incoming frame is formatted using EPD, then execution of the frame processing software module 344 may cause the AP 300 to use a suitable EPD technique or operation to identify the protocol type of the encapsulated data packet. Conversely, if execution of the EPD indicator detection software module 343 determines that the data packet encapsulated in the incoming frame is not formatted using EPD (or determines that the encapsulated data packet is formatted using LPD), then execution of the frame processing software module 344 may cause the AP 300 to use a suitable LPD technique or operation to identify the protocol type of the encapsulated data packet.

Figure 4:
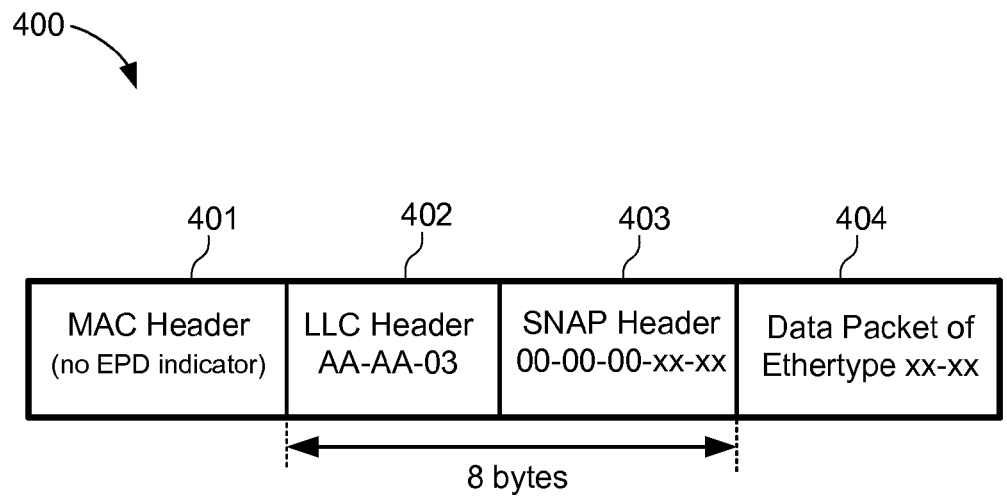
FIG. 4 shows an example data frame that contains an encapsulated data packet of Ethertype xx-xx formatted using LLC Packet Discrimination (LPD).

FIG. 4 depicts a legacy IEEE 802.11-compliant data frame 400 containing an encapsulated data packet of Ethertype xx-xx formatted using LPD. The data frame 400 is depicted in FIG. 4 as including a MAC header 401, an LLC header 402, a SNAP header 403, and a frame body 404. The MAC header 401 of data frame 400 depicted in FIG. 4 does not contain an EPD indicator. The absence of an EPD indicator in the MAC header 401 may indicate that LPD is used to format the encapsulated Ethertype data packet. The LLC header 402 is shown to include a value of "AA-AA-03," which may indicate the presence of a SNAP header (e.g., SNAP header 403) immediately following the LLC header 402. The SNAP header 403 is shown to include a value of "00-00-00-xx-xx," which may indicate that frame body 404 contains an encapsulated data packet of Ethertype xx-xx. For the example data frame 400 of FIG. 4, the LLC header 402 and the SNAP header 403 may together include 8 bytes of information.

Figure 5:
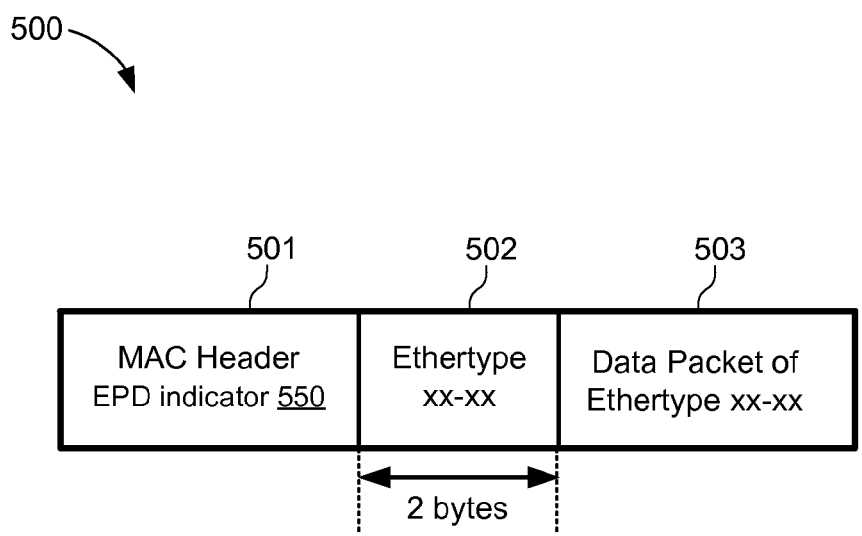
FIG. 5 shows an example data frame that contains an encapsulated data packet of Ethertype xx-xx formatted using Ethertype Packet Discrimination (EPD), in accordance with example embodiments.

FIG. 5 depicts an example data frame 500 containing an encapsulated data packet of Ethertype xx-xx formatted using EPD, in accordance with example embodiments. The data frame 500 is depicted in FIG. 5 as including a MAC header 501, an Ethertype field 502, and a frame body 503. The MAC header 501 is depicted in FIG. 5 as including an EPD indicator 550. The presence of the EPD indicator 550 in the MAC header 501 may indicate that an Ethertype data packet encapsulated in frame body 503 is formatted using EPD (e.g., rather than LPD). The Ethertype field 502 is depicted in FIG. 5 as a 2-byte field that stores a value of "xx-xx," which may indicate that frame body 503 contains a data packet of Ethertype xx-xx. Thus, the type of data packet encapsulated in frame body 503 may be identified by the Ethertype value stored in the Ethertype field 502. For one example, an Ethertype value=08-00 indicates that the data packet encapsulated in frame body 503 is an Internet Protocol version 4 (IPv4) data packet. For another example, an Ethertype value=08-DD indicates that the data packet encapsulated in frame body 503 is an IPv6 data packet. For another example, an Ethertype value=08-42 indicates that the data packet encapsulated in frame body 503 is a Wake-on LAN packet.

For at least some implementations, the data frame 500 of FIG. 5 may be created by replacing the 8-byte LLC/SNAP header 402/403 of data frame 400 of FIG. 4 with the 2-byte Ethertype field 502 of FIG. 5, thereby resulting in the overhead (e.g., header size) of data frame 500 being 6 bytes less than the overhead of data frame 400 of FIG. 4. Because the overhead of data frame 500 of FIG. 5 is less than the overhead of data frame 400 of FIG. 4, exchanging encapsulated Ethertype data packets between wireless devices using data frames 500 may result in a more efficient utilization of a shared wireless medium, for example, as compared with exchanging encapsulated Ethertype data packets using data frames 400. For other implementations, the Ethertype field 502 of data frame 500 may be another suitable length.

Figure 6A:
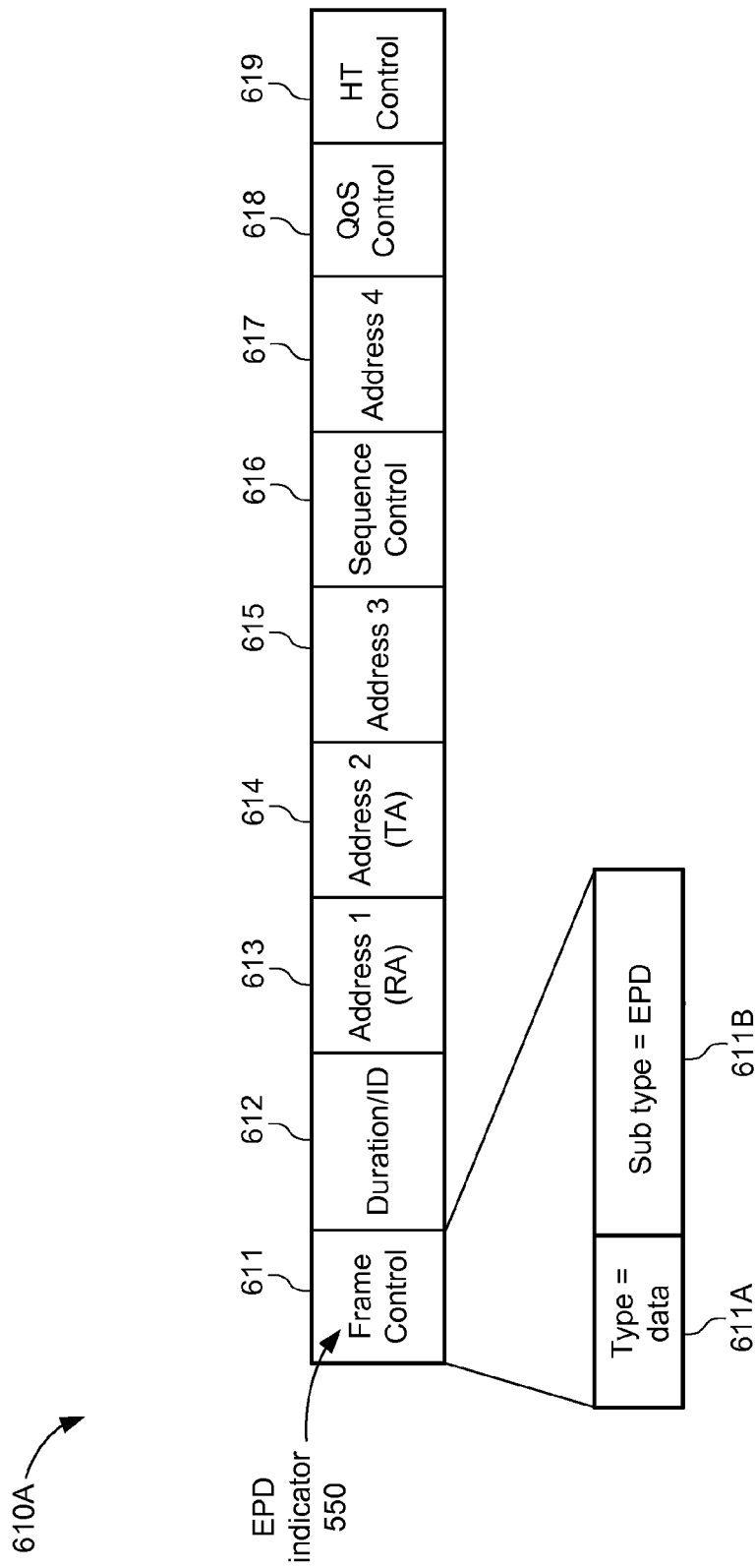
FIG. 6A shows one example MAC header within which the example embodiments may be implemented.

FIG. 6A depicts one example MAC header 610A within which the example embodiments may be implemented. For some implementations, MAC header 610A may be used as the MAC header 501 of data frame 500 of FIG. 5. For other implementations, MAC header 610A may be used as the MAC header of another suitable data frame. In addition or as an alternative, MAC header 610A may be used as the MAC header of any suitable control frame and/or management frame. As used herein, a frame that includes MAC header 610A may hereinafter be referred to as the "corresponding frame." As explained in more detail below, MAC header 610A may include an EPD indicator to indicate (e.g., to a receiving device) that the corresponding frame includes an encapsulated Ethertype data packet formatted using EPD (rather than LPD).

MAC header 610A is depicted in FIG. 6A as including a frame control field 611, a duration/ID field 612, an address 1 field 613, an address 2 field 614, an address 3 field 615, a sequence control field 616, an address 4 field 617, a Quality of Service (QoS) control field 618, and a high-throughput (HT) field 619. For at least some embodiments, the frame control field 611 is 2 bytes, the duration/ID field 612 is 2 bytes, the address 1 field 613 is 6 bytes, the address 2 field 614 is 6 bytes, the address 3 field 615 is 6 bytes, the sequence control field 616 is 2 bytes, the address 4 field 617 is 0 or 6 bytes, the QoS control field 618 is 0 or 2 bytes, and the HT field 619 is 0 or 4 bytes. For other embodiments, the fields of the MAC header 610A of FIG. 6A may be of other suitable lengths.

In some implementations, the address 4 field 617 may be omitted from MAC header 610A (e.g., when the corresponding frame is transmitted within a given BSS), the QoS control field 618 may be omitted (e.g., when the corresponding frame is not a QoS data frame), and/or the HT field 619 may be omitted (e.g., when the corresponding frame does not support HT capabilities).

The address 1 field 613 may be used to store a receiver address (RA) for the corresponding frame, and the address 2 field 614 may be used to store a transmitter address (TA) for the corresponding frame. The address 3 field 614 and the address 4 field 617 may be used to store a source address (SA) and a destination address (DA), for example, when the corresponding frame contains an A-MSDU. The sequence control field 616 may be used to assign sequence numbers to MSDUs, A-MSDUs, and/or MMPDUs, and may be used to assign fragment numbers to each fragment of an MSDU or MMPDU.

The EPD indicator 550 may be provided within the frame control field 611 of the MAC header 610A. The frame control field 611 is shown to include at least a 2-bit frame Type field 611A and a 4-bit Subtype field 611B (other fields of the frame control field 611 are not shown for simplicity). For some implementations, the Subtype field 611B may be populated with currently unused or reserved bit patterns to indicate that the corresponding frame uses EPD.

FIG. 7 shows a table 700 listing valid type and subtype values for the 2-bit frame Type field 611A and the 4-bit Subtype field 611B of FIG. 6A. For example, while a bit pattern of "0100" stored in the Subtype field 611B of MAC header 610A indicates a null data packet (NDP), a selected one of the unused or reserved bit patterns stored in the Subtype field 611B of MAC header 610A may indicate that the corresponding data frame uses EPD.

For some implementations, the reserved bit pattern of "1101" may be stored in the Subtype field 611B of MAC header 610A to indicate that the corresponding data frame uses EPD to format an encapsulated Ethertype data packet. More specifically, a frame type value of "10" and a subtype value of "1101" stored in the frame control field 611 of MAC header 610A may serve as the EPD indicator 550 for the corresponding data frame. Thereafter, when a receiving device receives the corresponding data frame and decodes MAC header 610A, extraction of the reserved bit pattern "1101" from the Subtype field 611B may indicate that the corresponding data frame contains an encapsulated Ethertype data packet formatted using EPD.

Figure 6B:
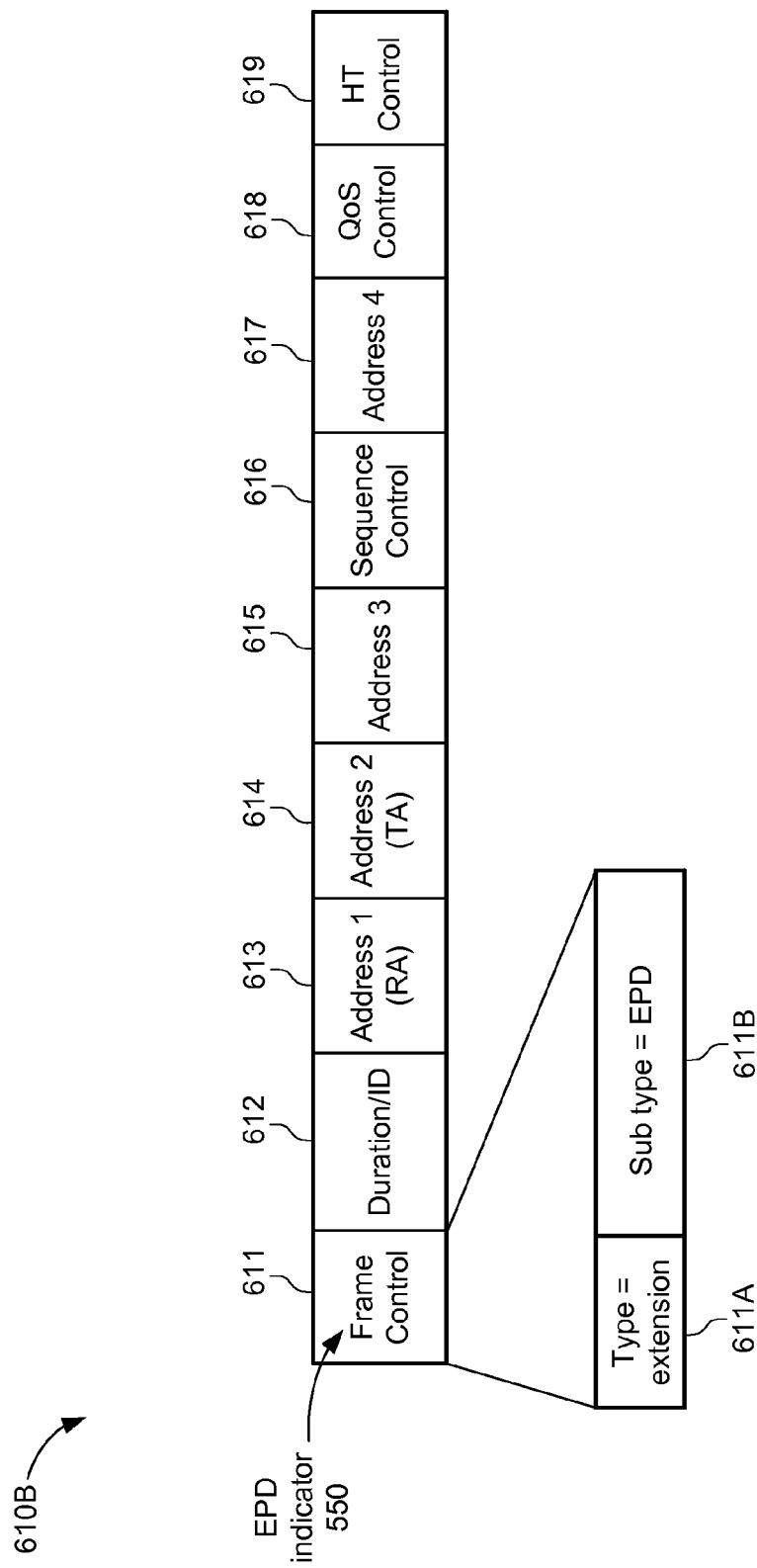
FIG. 6B shows another example MAC header within which the example embodiments may be implemented.

For other implementations, an unused or reserved bit pattern may be stored in the frame type field 611A and a selected one of a number of corresponding unused or reserved bit patterns may be stored in the Subtype field 611B to indicate that the corresponding frame uses EPD. For example, referring to the example MAC header 610B shown in FIG. 6B, the unused bit pattern of "11" may be stored in the frame Type field 611A of MAC header 610B to reference an extension Subtype, and any of the unused or reserved bit patterns (e.g., any of the values between "0001" and "1111," inclusive) associated with the extension subtype may be stored in the Subtype field 611B of MAC header 610B to indicate that the corresponding data frame uses EPD.

For one example, the extension subtype value "1000" may be stored in the Subtype field 611B to indicate a QoS Data+EPD subtype, which means that a QoS control header is present and that EPD is used (rather than LPD). For another example, the extension subtype value "1001" may be stored in the Subtype field 611B to indicate a QoS data+CF-ACK+EPD subtype, which means that a QoS control header is present in the contention-free (CF) ACK frame and that EPD is used (rather than LPD). For another example, the extension subtype value "1010" may be stored in the Subtype field 611B to indicate a QoS data+CF-Poll+ EPD subtype, which means that a QoS control header is present in the CF-Poll frame and that EPD is used (rather than LPD). For another example, the extension subtype value "1011" may be stored in the Subtype field 611B to indicate a QoS data+CF-ACK+CF-Poll+EPD subtype, which means that a QoS control header is present in the CF-ACK/CF-Poll frame and that EPD is used (rather than LPD). Other extension subtypes may be used to indicate, for example, other types of frames that use EPD (rather than LPD).

Thus, for the implementations described above with respect to FIG. 6B, a frame type value of "11" stored in the frame type field 611A, together with a subtype value other than "0000" (which indicates a DMG beacon) stored in the subtype field 611B, may serve as the EPD indicator 550. In this manner, when a receiving device receives a frame and decodes the MAC header 610B, extraction of the reserved bit pattern "11" from the frame type field 611A, along with extraction of any of the reserved bits patterns "0001" to "1111" from the subtype field 611B, may indicate that the corresponding frame uses EPD.

Figure 6C:
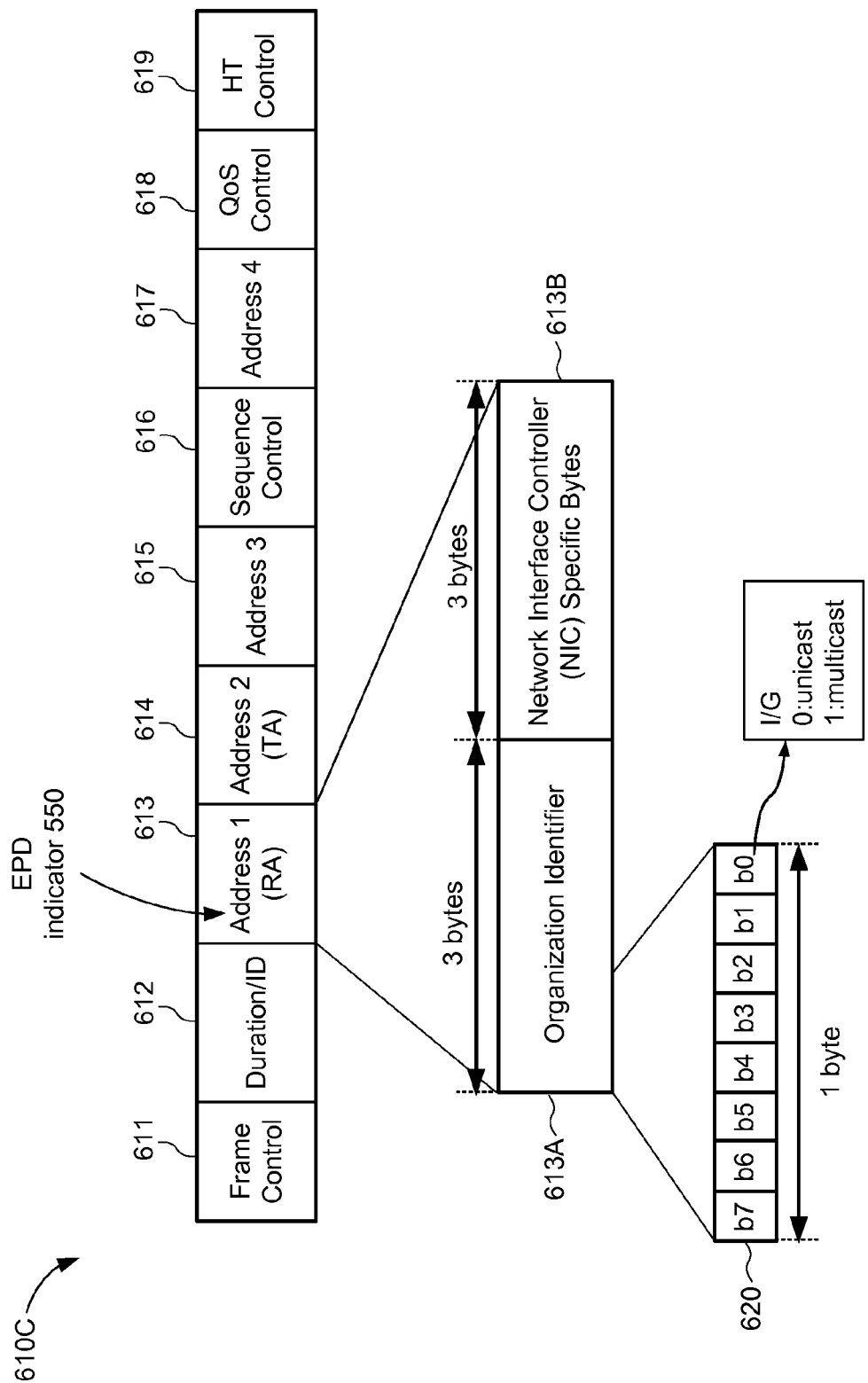
FIG. 6C shows another example MAC header within which the example embodiments may be implemented.

In accordance with other embodiments, the EPD indicator 550 may be provided within the address 1 field of a MAC header. For example, FIG. 6C depicts another example MAC header 610C within which the example embodiments may be implemented. The MAC header 610C is similar to the MAC headers 610A and 610B of FIGS. 6A and 6B, respectively, except that the EPD indicator 550 may be stored within the address 1 field 613 (rather than in the frame control field 611). As mentioned above, the address 1 field 613 stores the receiver address (RA) of the corresponding frame. For unicast frames, the RA may be the MAC address of the wireless device to which the corresponding frame is to be delivered. For multicast frames, the RA may be a group address indicating a group of wireless devices to which the corresponding frame is to be delivered. For broadcast frames, the RA may be set to all "1's" so that the corresponding frame is received by all wireless devices associated with the wireless network.

As shown in FIG. 6C, the address 1 field 613 may store a MAC address (e.g., of a receiving device). The MAC address, which may be commonly referred to as the organizationally unique identifier (OUI), typically includes 6 bytes of address information. The first 3 bytes of the MAC address (denoted by sub-field 613A) may identify which organization manufactured the device, and is commonly referred to as the "organization identifier." The organization identifier may be assigned by the Institute of Electrical and Electronic Engineers (IEEE). The second 3 bytes of the MAC address (denoted by sub-field 613B) may be used to uniquely identify the individual device, and is commonly referred to as the network interface controller (NIC) specific bytes.

The first byte 620 of the OUI is shown to include bits b0-b7. The least significant bit (LSB) of the first byte 620, bit b0, is typically used as the individual/group (I/G) bit of the MAC address. Thus, the LSB of the first byte 620 of the OUI may be referred to herein as the I/G bit. For example, setting the I/G bit=0 may indicate that the corresponding frame is a unicast frame, while setting the I/G bit=1 may indicate that the corresponding frame is a multicast frame. For some implementations, the I/G bit of the OUI may be used as the EPD indicator 550. More specifically, in accordance with the example embodiments, setting the I/G bit=0 may indicate that the corresponding unicast frame contains an Ethertype data packet encapsulated using EPD, while setting the I/G bit=1 may indicate that the corresponding multicast frame contains an Ethertype data packet encapsulated using LPD.

FIG. 8A depicts an example data frame 800 containing an encapsulated data packet of Ethertype xx-xx formatted using LPD, in accordance with example embodiments. The data frame 800 is shown in FIG. 8A to include a MAC header 801, an Ethertype 802, an LLC end field 803, a SNAP header 804, and a frame body 805 containing an encapsulated data packet of Ethertype xx-xx. The Ethertype 802, which immediately follows the MAC header 801, is shown to store an example reserved Ethertype value "AA-AA" signaling the use of LPD and indicating that a remainder of the LLC/SNAP value follows the Ethertype 802, for example, in the LLC end field 803. As shown in the example of FIG. 8A, the LLC end field 803 may store a value "03" that forms a remainder of the LLC/SNAP value. When the Ethertype value of "AA-AA" is combined with the LLC value "03," the resulting value "AA-AA-03" may form an LLC header similar to the LLC header of data frame 400 of FIG. 4. Thus, although the header portion of data frame 800 is similar to the header portion of data frame 400, data frame 400 and data frame 800 may signal the use of EPD in different manners. For example, while data frame 400 may indicate the use of LPD (rather than EPD) by not including an EPD indicator in data frame 400, data frame 800 may indicate the use of LPD by setting the Ethertype to the reserved value of "AA-AA." If the Ethertype of data frame 800 is not set to any reserved value that indicates the use of LPD, then the use of EPD may be presumed.

FIG. 8B depicts an example data frame 810 containing an encapsulated data packet of Ethertype xx-xx formatted using EPD, in accordance with example embodiments. The data frame 810 is shown in FIG. 8B to include a MAC header 811, an Ethertype 812, and a frame body 813 containing an encapsulated data packet of Ethertype xx-xx. As discussed above, an Ethertype value of "xx-xx" immediately following MAC header 811 may signal the use of EPD, and may indicate that the data frame 810 contains an encapsulated data packet of Ethertype xx-xx, where the Ethertype value of "xx-xx" is not an Ethertype value reserved to indicate the use of LPD (e.g., as described above with respect to FIG. 8A). Although data frame 810 of FIG. 8B may appear similar to the data frame 500 of FIG. 5, data frame 810 and data frame 500 may signal the use of EPD in different manners. For example, while data frame 500 of FIG. 5 may indicate the use of EPD by the presence of EPD indicator 550 in its MAC header 501, data frame 810 may be presumed to indicate the use of EPD unless the reserved Ethertype value (e.g., AA-AA) is stored in the Ethertype 812.

FIG. 9 shows an illustrative flowchart depicting an example operation 900 for processing an Ethertype data packet encapsulated in a frame. The example operation 900 may be performed by a first wireless device. The first wireless device receives a frame from a second wireless device over a wireless network, the frame including an encapsulated Ethertype data packet (902). As described above, the encapsulated Ethertype data packet may be formatted, for example, according to an LPD technique or according to an EPD technique. The first wireless device may detect a presence of an EPD indicator in the received frame (904). For some embodiments, the EPD indicator may be embedded within the frame control field of the received frame's MAC header (e.g., as described above with respect to FIGS. 6A and 6B). In some aspects, the EPD indicator may be a reserved or unused bit pattern stored in the subtype field of the frame control field. For other embodiments, the EPD indicator may be embedded within a MAC address stored in an address field of the received frame's MAC header (e.g., as described above with respect to FIG. 6C).

If the EPD indicator is present in the received frame, as tested at 905, then the first wireless device may identify a protocol type of the Ethertype data packet according to an EPD operation based on the presence of the EPD indicator in the received frame (906). The presence of the EPD indicator in the received frame may indicate that an Ethertype value of the Ethertype data packet immediately follows the received frame's MAC header. Otherwise, the first wireless device may identify the protocol type of the Ethertype data packet according to an LPD operation based on an absence of the EPD indicator in the received frame (908). The absence of the EPD indicator in the received frame may indicate that the Ethertype value of the Ethertype data packet is contained in the SNAP header of the received frame.

For the example of FIG. 9, the first and second wireless devices may be any suitable wireless devices. For example, each of the first and second wireless devices may an AP (e.g., AP 110 of FIG. 1 or AP 300 of FIG. 3) or a station (e.g., one of stations STA1-STA4 of FIG. 1 or STA 200 of FIG. 2).

Figure 10:
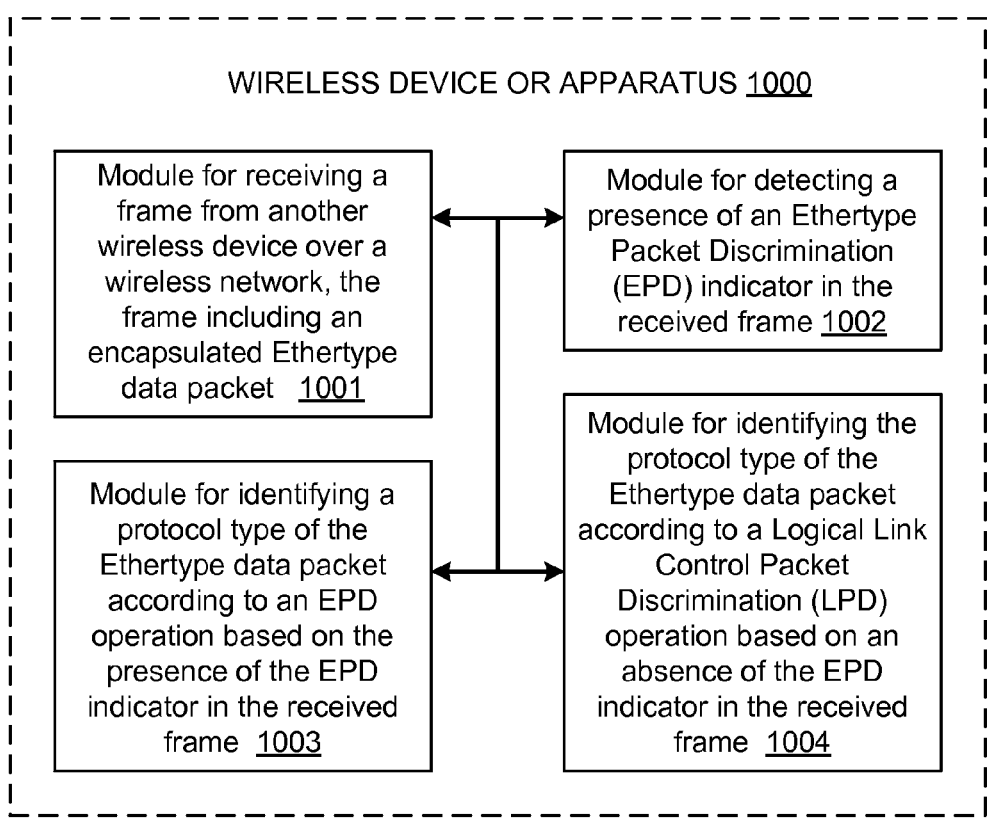
FIG. 10 shows another block diagram of several sample aspects of apparatuses configured to transmit a data frame to another wireless device as taught herein.

FIG. 10 shows an example wireless device or apparatus 1000 represented as a series of interrelated functional modules. A module 1001 for receiving, from another wireless device over a wireless network, a frame including an encapsulated Ethertype data packet may correspond at least in some aspects to, for example, a processor as discussed herein (e.g., processor 230 of FIG. 2 and/or processor 330 of FIG. 3). A module 1002 for detecting a presence of an Ethertype Packet Discrimination (EPD) indicator in the received frame may correspond at least in some aspects to, for example, a processor as discussed herein (e.g., processor 230 of FIG. 2 and/or processor 330 of FIG. 3). A module 1003 for identifying a protocol type of the Ethertype data packet according to an EPD operation based on the presence of the EPD indicator in the received frame may correspond at least in some aspects to, for example, a processor as discussed herein (e.g., processor 230 of FIG. 2 and/or processor 330 of FIG. 3). A module 1004 for identifying the protocol type of the Ethertype data packet according to a Logical Link Control Packet Discrimination (LPD) operation based on an absence of the EPD indicator in the received frame may correspond at least in some aspects to, for example, a processor as discussed herein (e.g., processor 230 of FIG. 2 and/or processor 330 of FIG. 3).

The functionality of the modules of FIG. 10 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 10, as well as other components and functions described herein, may be implemented using any suitable means. Such means also may be implemented, at least in part, using corresponding structure as taught herein. For example, the components described above in conjunction with the "module for" components of FIG. 10 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method for processing an Ethertype data packet encapsulated in a frame using an Ethertype Packet Discrimination (EPD) operation or a Logical Link Control Packet Discrimination (LPD) operation, the method performed by a first wireless device and comprising:
receiving the frame from a second wireless device over a wireless network;
detecting a presence or absence of an EPD indicator in the received frame;
based on the presence of the EPD indicator in the received frame, identifying a protocol type of the Ethertype data packet according to the EPD operation; and
based on the absence of the EPD indicator in the received frame, identifying the protocol type of the Ethertype data packet according to the LPD operation,
wherein the presence of the EPD indicator indicates that an Ethertype value of the Ethertype data packet immediately follows a Media Access Control (MAC) header of the received frame, and the absence of the EPD indicator indicates that the Ethertype value of the Ethertype data packet is included in a Subnetwork Access Protocol header (SNAP) of the received frame.

2. The method of claim 1, the EPD indicator embedded within a frame control field of a header of the received frame.

3. The method of claim 2, the frame control field including a subtype field storing the EPD indicator.

4. The method of claim 3, the wireless network compliant with one or more protocols of the IEEE 802.11 standards, and the EPD indicator consisting of a value reserved or unused by the IEEE 802.11 standards.

5. The method of claim 1, the EPD indicator embedded within a Media Access Control (MAC) address stored in the received frame.

6. A first wireless device configured to process an Ethertype data packet encapsulated in a frame using an Ethertype Packet Discrimination (EPD) operation or a Logical Link Control Packet Discrimination (LPD) operation, the first wireless device comprising:
one or more processors; and
a memory configured to store instructions that, when executed by the one or more processors, cause the first wireless device to:
receive the frame from a second wireless device over a wireless network;
detect a presence or absence of an EPD indicator in the received frame;
based on the presence of the EPD indicator in the received frame, identify a protocol type of the Ethertype data packet according to an EPD operation; and
based on the absence of the EPD indicator in the received frame, identify the protocol type of the Ethertype data packet according to the LPD operation,
wherein the presence of the EPD indicator indicates that an Ethertype value of the Ethertype data packet immediately follows a Media Access Control (MAC) header of the received frame, and the absence of the EPD indicator indicates that the Ethertype value of the Ethertype data packet is included in a Subnetwork Access Protocol header (SNAP) of the received frame.

7. The first wireless device of claim 6, the EPD indicator embedded within a frame control field of a header of the received frame.

8. The first wireless device of claim 7, the frame control field including a subtype field storing the EPD indicator.

9. The first wireless device of claim 8, the wireless network compliant with one or more protocols of the IEEE 802.11 standards, and the EPD indicator consisting of a value reserved or unused by the IEEE 802.11 standards.

10. The first wireless device of claim 6, the EPD indicator embedded within a Media Access Control (MAC) address stored in the received frame.

11. A non-transitory computer-readable storage medium storing one or more programs containing instructions that, when executed by one or more processors of a first wireless device, cause the first wireless device to process an Ethertype data packet encapsulated in a frame using an Ethertype Packet Discrimination (EPD) operation or a Logical Link Packet Discrimination (LPD) operation, by performing operations comprising:
receiving the frame from a second wireless device over a wireless network;
detecting a presence or absence of an EPD indicator in the received frame;

based on the presence of the EPD indicator in the received frame, identifying a protocol type of the Ethertype data packet according to the EPD operation; and based on the absence of the EPD indicator in the received frame, identifying the protocol type of the Ethertype data packet according to the LPD operation, wherein the presence of the EPD indicator indicates that an Ethertype value of the Ethertype data packet immediately follows a Media Access Control (MAC) header of the received frame, and the absence of the EPD indicator indicates that the Ethertype value of the Ethertype data packet is included in a Subnetwork Access Protocol header (SNAP) of the received frame.

12. The non-transitory computer-readable storage medium of claim 11, the EPD indicator embedded within a frame control field of a header of the received frame.

13. The non-transitory computer-readable storage medium of claim 12, the frame control field including a subtype field storing the EPD indicator.

14. The non-transitory computer-readable storage medium of claim 13, the wireless network compliant with one or more protocols of the IEEE 802.11 standards, and the EPD indicator consisting of a value reserved or unused by the IEEE 802.11 standards.

15. The non-transitory computer-readable storage medium of claim 11, the EPD indicator embedded within a Media Access Control (MAC) address stored in the received frame.

16. A first wireless device configured to process an Ethertype data packet encapsulated in a frame using an Ethertype Packet Discrimination (EPD) operation or a Logical Link Control Packet Discrimination (LPD) operation, the first wireless device comprising:

means for receiving the frame from a second wireless device over a wireless network;

means for detecting a presence or absence of an EPD indicator in the received frame;

means for identifying a protocol type of the Ethertype data packet according to the EPD operation based on the presence of the EPD indicator in the received frame; and means for identifying the protocol type of the Ethertype data packet according to the LPD operation based on the absence of the EPD indicator in the received frame, wherein the presence of the EPD indicator indicates that an Ethertype value of the Ethertype data packet immediately follows a Media Access Control (MAC) header of the received frame, and the absence of the EPD indicator indicates that the Ethertype value of the Ethertype data packet is included in a Subnetwork Access Protocol header (SNAP) of the received frame.

17. The first wireless device of claim 16, the EPD indicator embedded within a frame control field of a header of the received frame.

18. The first wireless device of claim 17, the frame control field including a subtype field storing the EPD indicator.

19. The first wireless device of claim 18, the wireless network compliant with one or more protocols of the IEEE 802.11 standards, and the EPD indicator consisting of a value reserved or unused by the IEEE 802.11 standards.

20. The first wireless device of claim 16, the EPD indicator embedded within a Media Access Control (MAC) address stored in the received frame.

* * * * *